United States Patent
Kiba et al.

(10) Patent No.: US 7,263,580 B2
(45) Date of Patent: Aug. 28, 2007

(54) CACHE FLUSH BASED ON CHECKPOINT TIMER

(75) Inventors: Hiroyasu Kiba, Yokohama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/849,022

(22) Filed: May 20, 2004

(65) Prior Publication Data

US 2005/0246488 A1 Nov. 3, 2005

(30) Foreign Application Priority Data

Apr. 28, 2004 (JP) ............................. 2004-132479

(51) Int. Cl.
*G06F 12/00* (2006.01)
(52) U.S. Cl. ...................... 711/113; 711/141; 711/142
(58) Field of Classification Search ........ 711/111–114, 711/135, 141–142, 146, 160–161
See application file for complete search history.

(56) References Cited

U.S. PATENT DOCUMENTS

| | | | |
|---|---|---|---|
| 5,812,757 A * | 9/1998 | Okamoto et al. ............. 714/11 |
| 5,922,040 A * | 7/1999 | Prabhakaran ............... 701/117 |
| 6,021,408 A * | 2/2000 | Ledain et al. .................. 707/8 |
| 6,069,635 A | 5/2000 | Suzuoki et al. |
| 6,088,773 A * | 7/2000 | Kano et al. .................. 711/161 |
| 6,192,043 B1 * | 2/2001 | Rochberger .................. 370/351 |
| 6,202,079 B1 * | 3/2001 | Banks ......................... 718/101 |
| 6,243,809 B1 | 6/2001 | Gibbons et al. |
| 6,412,045 B1 | 6/2002 | DeKoning et al. |
| 6,418,515 B1 * | 7/2002 | Kurosawa .................... 711/135 |
| 6,874,065 B1 * | 3/2005 | Pong et al. .................. 711/135 |
| 2002/0138699 A1 | 9/2002 | Okamura |
| 2002/0178336 A1 * | 11/2002 | Fujimoto et al. ........... 711/165 |
| 2003/0221062 A1 * | 11/2003 | Shimada ..................... 711/114 |
| 2005/0021657 A1 * | 1/2005 | Negishi et al. ............. 709/213 |

FOREIGN PATENT DOCUMENTS

| | | |
|---|---|---|
| JP | 895861 | 4/1996 |
| JP | 10254780 | 9/1998 |
| JP | 10320300 | 12/1998 |

* cited by examiner

*Primary Examiner*—Donald Sparks
*Assistant Examiner*—Matthew Bradley
(74) *Attorney, Agent, or Firm*—Mattingly, Stanger, Malur & Brundidge, P.C.

(57) ABSTRACT

A data processing system is used which is provided with a computer for executing a program, and a storage unit having a cache memory for storing data transmitted as a result of execution of the program and a disk device for storing data stored in the cache memory. The storage unit responds to an input of a request for storing data transmitted from the program to store the transmitted data in the cache memory. Next, the storage unit responds to an input of a request for flashing transmitted from the program to store, in the disk device, the data stored in the cache memory.

7 Claims, 4 Drawing Sheets

CACHE FLUSH BASED ON CHECKPOINT TIMER

CROSS-REFERENCE TO RELATED APPLICATION

The present application claims priority from Japanese application JP2004-132479 filed on Apr. 28, 2004, the content of which is hereby incorporated by reference into this application.

BACKGROUND OF THE INVENTION

The present invention relates to a cache control technique for executing a cache flash process of a storage unit having a cache memory at the timing determined externally of the storage unit.

A cache control method is available in which for the purpose of stopping a disk storage unit at the timing that the power supply is interrupted, the contents of a cache memory inside the disk storage unit is forcibly flashed and stored in a magnetic disk or a disk memory device. Such a technique is disclosed in JP-A-10-254780.

SUMMARY OF THE INVENTION

The conventional technique as above faces a problem that a flash command cannot be applied to the storage unit from a program operating in a data processing unit. In addition, the capacity of the cache memory increases and the conventional technique has a disadvantage that data stored in the cache memory is not stored in the disk memory device until the cache memory is filled up and consequently a large amount of data stored in the cache memory are stored in the disk memory device at the cost of much time when the power supply is interrupted.

An object of the invention is to achieve sequential write to a memory medium from a cache memory.

To accomplish the above object, in a synchronous point process of an application program in a host unit, a flash command is applied to a cache memory attached to a storage unit to make the synchronous point process cooperative with a flash process to thereby permit data to be stored sequentially in a memory medium before the cache memory is filled up.

DESCRIPTION OF THE EMBODIMENTS

Figure 1:
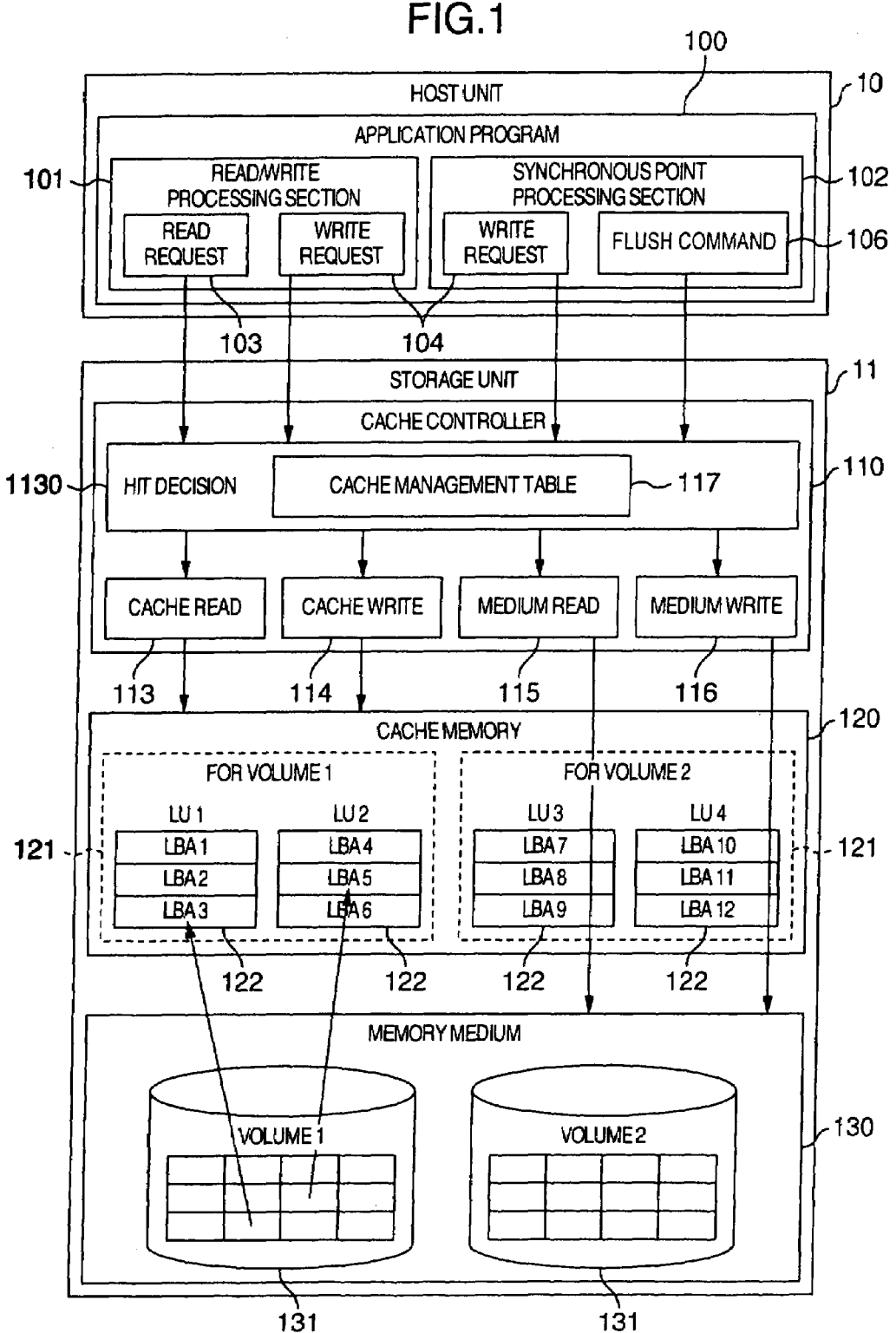
FIG. 1 is a block diagram showing a configuration of host unit and storage unit according to an embodiment of the invention.

The present invention will now be described by way of example with reference to the accompanying drawings. Referring first to FIG. 1, a host unit and a storage unit according to an embodiment of the invention are configured as illustrated therein. In the present embodiment, a system comprises a host unit 10 and a storage unit 11. An application program 100 is operating in the host unit 10 and a read/write processing section 101 and a synchronous point processing section 102 are allotted to the application program 100. The read/write processing section 101 issues a read request 103 and a write request 104 to the storage unit 11. The synchronous point processing section 102 issues a write request 104 and a flash command 106 to the storage unit 11. Allotted to the storage unit 11 are a cache controller 110, a cache memory 120 and a memory medium 130. The cache controller 110 consults a cache management table 117 to carry out hit decision 1130, cache read 113 and cache write 114 as applied to the cache memory 120 and medium read 115 and medium write 116 as applied to the memory medium 130. The cache memory 120 is divided into partitions 121 volume by volume and one partition 121 is fractionated or subdivided into partitions 122 each being in a unit of LU (logical unit). Stored in the LU are LBA's (logical block addresses). The memory medium 130 has a plurality of volumes 131. In the present embodiment, the cache memory 120 is described as being divided into the partitions 121 each being in a unit of volume and the partitions 122 each being in a unit of LU but the division into partition 121 in a unit of volume and partition 122 in a unit of LU is not always necessary.

Figure 5:
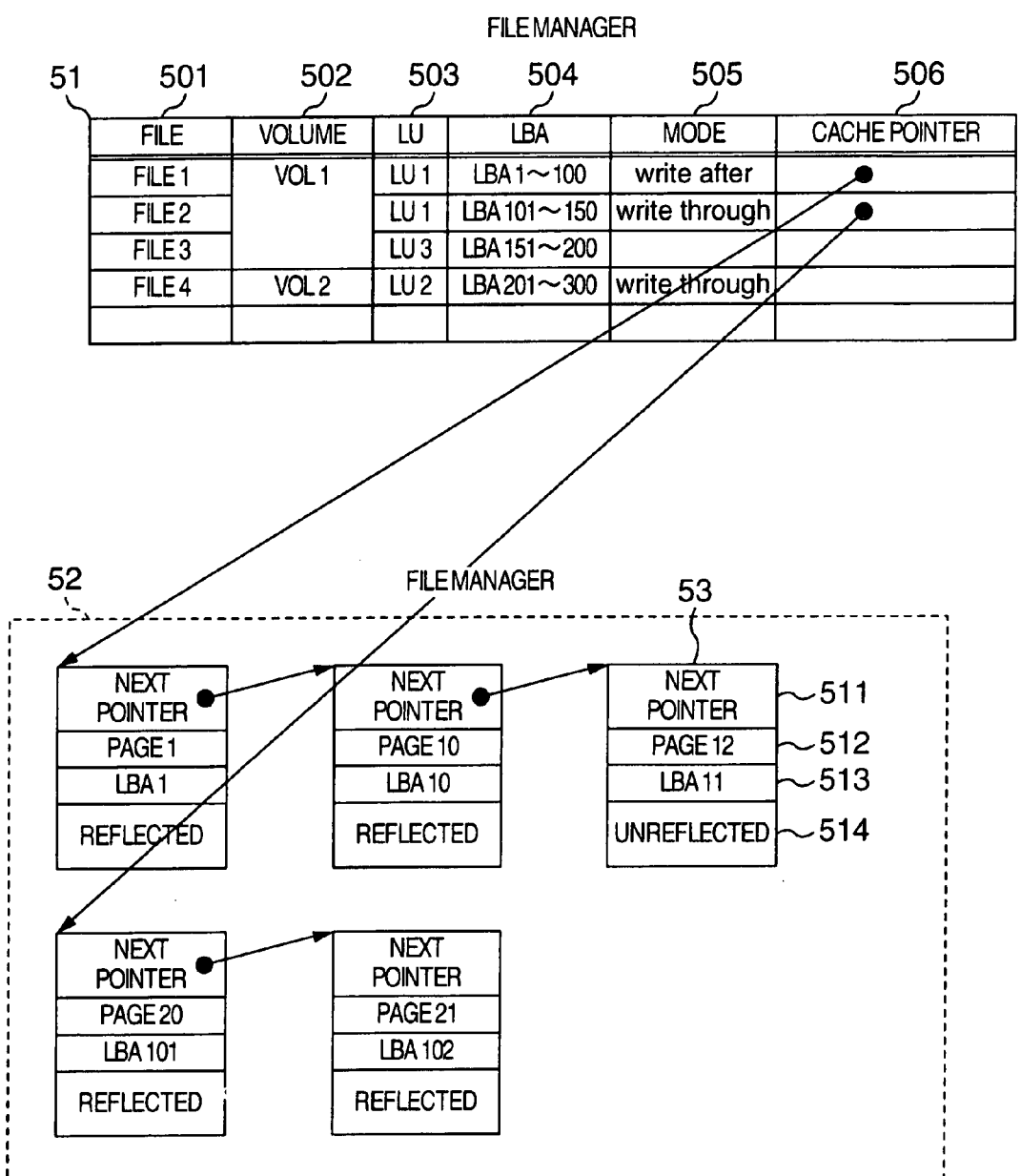
FIG. 5 is a diagram showing a data structure of a cache management table in the embodiment of the invention.

Referring to FIG. 5, there is illustrated a data structure of the cache management table 117 in the cache controller 110. The cache management table 117 includes a file manager 51 and a cache manager 52. In the file manager 51, file names are held at file 501, volumes storing files are indicated at volume 502, stored LU's are indicated at LU 503 and stored LBA's are indicated at LBA 504. Indicated at mode 505 are available modes of which one is a write through mode in which upon a file write request, write operation is applied to both the memory medium 130 and the cache memory 120 and the other is a write after mode in which write to only the cache memory 120 is carried out during a write request and write operation to the storage medium 130 is carried out during flashing. A head pointer of a list representing a cache management entry 53 used by a file of interest is held at cache pointer 506. The cache manager 52 includes a plurality of cache management entries 53 having information of corresponding cache pages. Next pointer 511 designates the next cache management entry 53 of the file of interest indicated at 501. Page 512 designates a page in the cache memory 120. LBA 513 indicates a store position in the memory medium 130. Held at reflected or unreflected 514 is a status as to whether the cache memory page of interest is reflected upon the memory medium 130 (coincidence of contents) or is not reflected upon the memory medium 130 (non-coincidence of contents).

Figure 2:
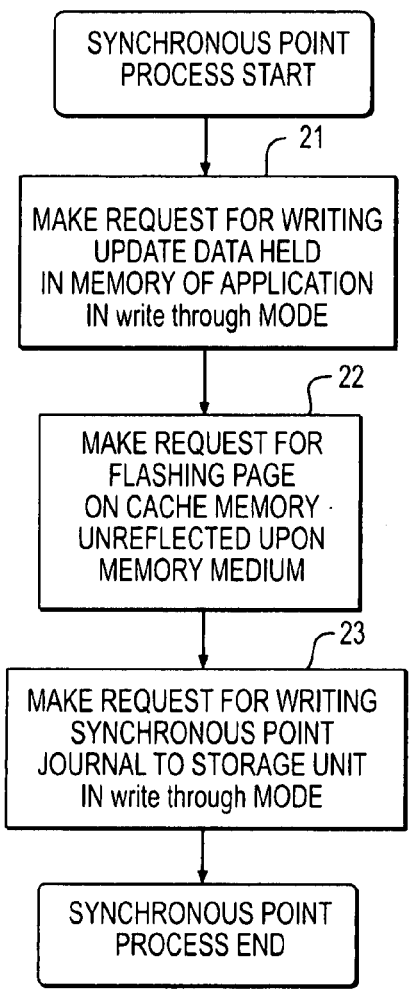
FIG. 2 is a flowchart showing a synchronous point process of an application of the host unit in the embodiment of the invention.

Referring to FIG. 2, the flow of a synchronous point process in the synchronous point processing section 102 will be described. A write request 104 is made, in a write through mode, to update data held in a memory of the application program 100 and unreflected upon the storage unit 11 (step 21), a flash command 106 is issued to the storage unit 11 in order to reflect, upon the memory medium 130, a page being on the cache memory 120 and unreflected upon the memory medium 130 (step 22) and a write request 104 is made, in the write through mode, to the storage unit 11 for requesting write of a synchronous point journal which records, in the storage unit 11, completion of the synchronous point process (step 23). In the case of a transaction process, the synchronous point (synchronous timing) corresponds to a checkpoint or the timing for commitment. Accordingly, the application program 100 may be a database management program or a transaction monitor. Alternatively, the application program 100 may be hardware, program or object suitable for notifying the synchronous timing.

Figure 3:
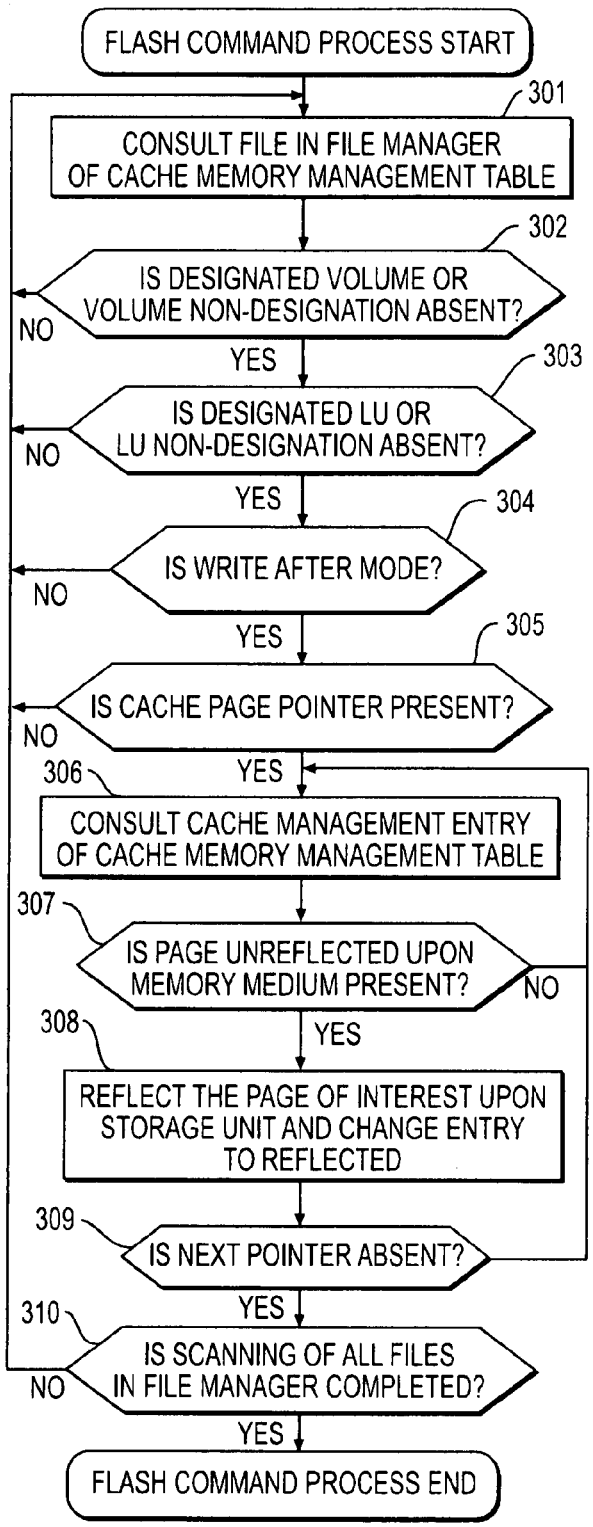
FIG. 3 is a flowchart showing a flash command process by the storage unit in the embodiment of the invention.

Turning now to FIG. 3, the flow of a flash command process by the cache controller 110 will be described. A file manager 51 (see FIG. 5) of cache management table 117 is scanned and information of a first file at 501 is consulted (step 301). If a condition either for coincidence of a volume commanded by a flash command 106 with a volume at 502 or for non-designation of volume does not stand, the scanning is returned to the next file at 501 but if the condition stands, the program proceeds to the next step (step 302). Then, if a condition either for coincidence of an LU commanded by the flash command 106 with an LU at 503 or for non-designation of LU does not stand, the scanning is returned to the next file at 501 but if the condition stands, the program proceeds to the next step (step 303). Subsequently, if a mode at 505 does not coincide with write after, indicating that the file is reflected upon the memory medium 130, the scanning is returned to the next file at 501 but if the mode at 505 coincides with write after, the program proceeds to the next step (step 304). Then, if a cache pointer at 506 does not point any cache management entry 53, the scanning is returned to the next file at 501 but if the cache pointer at 506 points a cache management entry 53, the program proceeds to the next step (step 305). Thereafter, the cache management entry 53 is consulted (step 306). If a page indicated at 512 in the cache management entry 53 has been reflected upon the memory medium 130, the scanning is returned to the next cache management entry 53 but if it is not reflected upon the memory medium 130, the program proceeds to the next step (step 307). Then, the page indicated at 512 in the cache management entry 53 undergoes medium write 116 so as to be written to the memory medium 130 and the cache management entry 53 is changed to reflected (step 308). Subsequently, if the next pointer 511 is present, the scanning is returned to the next cache management entry 53 but if the next pointer 511 is absent, the program proceeds to the next step (step 309). Then, if scanning of all files in the file manager 51 is not completed, the scanning is returned to the next file at 501 but if completed, the flash command process is ended (step 310). The cache controller 110 can be implemented with a program, object or hardware.

Figure 4:
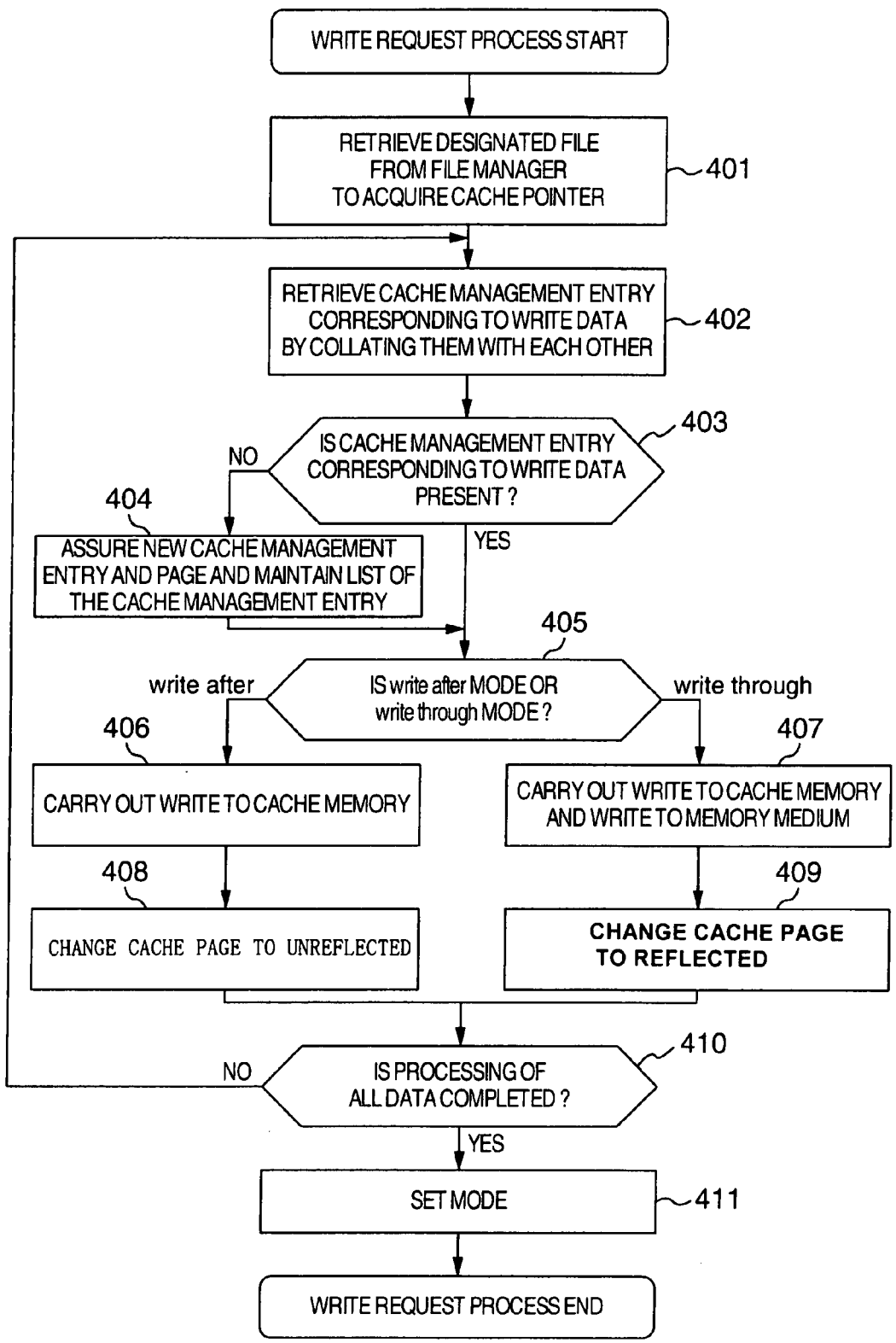
FIG. 4 is a flowchart showing a write request process by the storage unit in the embodiment of the invention.

Turning now to FIG. 4, the flow of a write request process by the cache controller 110 will be described. By scanning the file manager 51 of cache management table 117 to retrieve a file at 501 coincident with a file designated by a write request 104, a cache pointer at 506 is acquired (step 401). Then, a cache management entry 53 corresponding to write data is retrieved by collating them with each other (step 402) and if a cache management entry 53 corresponding to the write data is hit, the program proceeds to the next step but if any cache management entry 53 corresponding to the write data is not hit (step 403), a new cache management entry 53 and a cache memory page are secured and a list of the cache management entry 53 is maintained (step 404). Subsequently, if a mode designated during the write request 104 is write after, the program branches to step 406 (step 405) and the write data undergoes cache write 114 so as to be written to the cache memory 120 (step 406), the cache management entry 53 is changed to reflected at 514 (step 408) and the program proceeds to step 410. On the other hand, if the mode designated during the write request 104 is write through, the program branches to step 407 (step 405) so that the write data undergoes cache write 114 so as to be written to the cache memory 120 and a medium write 116 is applied to the memory medium 130 (step 407). Then, the cache management entry 53 is changed to reflected at 514 (step 409) and the program proceeds to step 410. If the collation of all write data with the cache management entry 53 is not completed, the program returns to the collation retrieval but if completed, the program proceeds to the next step (step 410) and the mode designated during the write request 104 is set at mode 505 (step 411), thus ending the write request process.

As described above, even in the event that a fault causing the contents of the cache memory of storage unit to be lost takes place, it can be guaranteed that update contents of the application program prevailing up to the synchronous timing (checkpoint or commitment) can be written in the memory medium and therefore, in the recovery process of the application program after the occurrence of the fault, the recovery start can be determined accurately.

Further, the sequential cache flash can be carried out by controlling the application program and therefore, in the event that a power supply failure takes place in the storage unit having a cache memory of a large capacity, much time required for handling the stop process can be avoided not by the control of the application but by the flash process of a large amount of update data stored in the cache memory.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A cache control method in a data processing system having a computer, which includes a synchronous point processing section, for executing a program, and a storage unit having a cache memory for storing data transmitted as a result of execution of said program, a cache controller having a cache management table and a disk device having memory medium for storing data stored in said cache memory, wherein said synchronous point processing unit makes and sends a write request of updated data held in the memory medium of data processed by the program in a write-through mode to update data of the program unreflected upon said disk device, issues a flash command to said storage unit in order to reflect the updated data upon the memory medium at a timing synchronous with a commitment to perform a transaction process, and makes and sends a write-request, in the write-through mode, to said storage unit for requesting write of a synchronous point journal which records, in the storage unit, completion of a synchronous point process until a check point from said computer to said storage unit, wherein said cache controller of storage unit, responding to said flash command from said synchronous point processing section, if a mode in said cache management table corresponding to a page for said flash command coincides with write-after, writes the page indicated by a cache pointer for the page in said cache management table to said memory medium and changes a cache management entry in said cache management table to a state of reflected, wherein said cache controller of said storage unit, responding to said write request, if a mode designated during said write request is write-after, writes data in said cache memory, and changes said cache management entry for the page to a state of unreflected, and wherein said cache controller of said storage unit, responding to said write request, if said mode designated during said write request is not write-after, writes the page to both said cache memory and said memory medium, thereafter changes said cache management entry for the page to the state reflected.

2. The cache control method according to claim 1, wherein each of said write request and said flash command includes area identification information for specifying areas in said cache memory, and wherein when said write request is inputted, said transmitted data is stored in an area specified by the area identification information of said write request and when said flash command is inputted, the data stored in the area specified by the area identification information of said write request is stored in said disk device.

3. The cache control method according to claim 2, wherein the area identification information of said cache memory includes volume identification information and segment identification information.

4. A data processing system comprising:

a computer, which includes a synchronous point processing section for executing a program, and a storage unit having a cache memory for storing data transmitted as a result of execution of said program, a cache controller having a cache management table and a disk device having memory medium for storing data stored in said cache memory, wherein said synchronous point processing section makes and sends a write request of updated data held in the memory medium of data processed by the program in a write-through mode to update data of the program unreflected upon said disk device, issues a flash command to said storage unit in order to reflect the updated data upon the memory medium at a timing synchronous with a commitment to perform a transaction process, and makes and sends a write request, in the write-through mode, to said storage unit for requesting write of a synchronous point journal which records, in the storage unit, completion of a synchronous point process until a check point from said computer to said storage unit, wherein said cache controller of said storage unit, responding to said flash command from said synchronous point processing section, if a mode in said cache management table corresponding to a page for said flash command coincides with write-after, writes the page indicated by a cache pointer for the page in said cache management table to said memory medium and changes a cache management entry in said cache management table to a state of reflected, wherein said cache controller of said storage unit, responding to said write request, if a mode designated during said write request is write-after, writes data in said cache memory, and changes said cache management entry for the page to a state of unreflected, and wherein said cache controller of said storage unit, responding to said write request, if said mode designated during said write request is not write-after, writes the page to both said cache memory and said memory medium, thereafter changes said cache management entry for the page to the state of reflected.

5. The data processing system according to claim 4, wherein each of said write request and said flash command includes area identification information for specifying areas in said cache memory, and wherein when said write request is inputted, said transmitted data is stored in an area specified by the area identification information of said write request and when said flash command is inputted, the data stored in the area specified by the area identification information of said write request is stored in said disk device.

6. The data processing system according to claim 5, wherein the area identification information of said cache memory includes volume identification information and segment identification information.

7. A computer-readable medium having stored thereon a data processing program for functioning a data processing system having a computer, which includes a synchronous point processing section, which executes said data processing program, and a storage unit having a cache memory for storing data transmitted as a result of execution of said program, a cache controller having a cache management table and a disk device having memory medium for storing data stored in said cache memory, wherein said data processing program when executed causes the steps to be performed of:

in said synchronous point processing section making and sending a write request of updated data held in the memory medium of data processed by the program in a write-through mode, thereby to update data of the program unreflected upon said disk device, issuing a flash command to said storage unit in order to reflect the updated data upon the memory medium at a timing synchronous with a commitment to perform a transaction process, onto said memory medium, and making and sending a write request, in the write-through mode, to said storage unit for requesting write of a synchronous point journal which records, in the storage unit, completion of a synchronous point process until a check point from said computer to said storage unit, in said cache controller of said storage unit, in response to said flash command from said synchronous point processing section, if a mode in said cache management table corresponding to a page for said flash command coincides with write-after, writing the page indicated by a cache pointer for the page in said cache management table to said memory medium and changing a cache management entry in said cache management table to a state of reflected, in said cache controller of said storage unit, in response to said write request, if a mode designated during said write request is write-after, writing data in said cache memory, and changing said cache management entry for the page to a state of unreflected, and in said cache controller of said storage unit, in response to said write request, if said mode designated during said write request is not write-after, writing the page to both said cache memory and said memory medium, thereafter changing said cache management entry for the page to the state of reflected.

* * * * *